United States Patent
Rohani

Patent Number: 6,157,631
Date of Patent: Dec. 5, 2000

[54] METHOD AND SYSTEM FOR GENERATING AND USING SYNCHRONIZED AND UNSYNCHRONIZED SPREAD SPECTRUM SIGNALS IN A CELLULAR COMMUNICATIONS SYSTEM

[75] Inventor: Kamyar Rohani, Grapevine, Tex.

[73] Assignee: Motorola, Inc., Schaumburg, Ill.

[21] Appl. No.: 09/003,975

[22] Filed: Jan. 7, 1998

[51] Int. Cl.[7] .................... H04B 1/69; H04J 3/06
[52] U.S. Cl. .............. 370/342; 370/350; 370/515; 375/367
[58] Field of Search .................. 370/328, 329, 370/335, 342, 345, 349, 350, 503, 514, 515; 375/130, 140, 145, 149, 356, 365, 337; 455/502, 524

[56] References Cited

U.S. PATENT DOCUMENTS

| | | | |
|---|---|---|---|
| 5,546,421 | 8/1996 | Basile et al. | 375/200 |
| 5,703,873 | 12/1997 | Ojanpera et al. | 370/332 |
| 6,018,667 | 1/2000 | Ghosh et al. | 455/502 |

OTHER PUBLICATIONS

K. Higuchi, M. Sawahashi, and F. Adachi, "Fast Cell Search Algorithm In DS–CDMA Mobile Radio Using Long Spreading Codes" Mar. 1, 1997, pp. 1430–1434.

*Primary Examiner*—Chi H. Pham
*Assistant Examiner*—Kwang B. Yao
*Attorney, Agent, or Firm*—L. Bruce Terry

[57] ABSTRACT

In a cellular communications system having synchronized base stations and unsynchronized base stations, wherein the synchronized base stations are synchronized to system time and have a common pilot PN sequence used for all synchronized pilot channels, a marker sequence is selected. The selected marker sequence is comprised of an M-chip portion of the common pilot PN sequence. Next, a coded portion of an unsynchronized pilot PN sequence is generated wherein the coded portion identifies a selected unsynchronized base station. The marker sequence and the coded portion of the unsynchronized pilot PN sequence are combined to form the unsynchronized pilot PN sequence that is different from the common pilot PN sequence. Thereafter, an unsynchronized pilot channel baseband signal of an unsynchronized base station is spread with the unsynchronized pilot PN sequence to produce the unsynchronized pilot channel.

22 Claims, 6 Drawing Sheets

METHOD AND SYSTEM FOR GENERATING AND USING SYNCHRONIZED AND UNSYNCHRONIZED SPREAD SPECTRUM SIGNALS IN A CELLULAR COMMUNICATIONS SYSTEM

FIELD OF THE INVENTION

This invention relates in general to communication systems and, more particularly, to a method and system for integrating synchronized and unsynchronized spread spectrum signals in a cellular communications system.

BACKGROUND OF THE INVENTION

In cellular communications systems implemented in accordance with American National Standards Institute (ANSI) J-STD-008, all base station digital transmissions are referenced or synchronized to a common system-wide clock that is synchronous with Global Positioning System (GPS) time. As used here, synchronized or synchronous events means that two or more events happen at the same frequency with a constant relative phase. One of the synchronized signals transmitted by each CDMA base station is a pilot channel.

A pilot channel is an unmodulated, direct-sequence spread spectrum signal transmitted so that a personal station or subscriber unit may acquire the timing of the forward CDMA channel, may obtain a phase reference for coherent demodulation, and may measure signal strength of a reference signal for comparing relative signal strengths between base stations.

The pilot channel assists the subscriber unit in initial acquisition of CDMA signals of the cellular system when the subscriber unit is powered up, and helps the mobile compare signal strength of signals from different base stations in order to determine when to handoff. Pilot signal strength may be defined as the ratio of received pilot energy to overall received energy, or Ec/Io.

The pilot channel is designed to be easy for the subscriber unit to find. Thus, it is the simplest code channel from a base station; all base stations use Walsh code 0 (all ones), and no long code. The pilot PN sequence is a pair of modified maximal length PN (pseudnoise) sequences with period $2^{15}$, which is used to spread the forward CDMA channel and the reverse CDMA channel. The pilot channel sequence repeats 75 times every 2 seconds, or every 26.667 milliseconds. The pilot channel is also the strongest (most energy) code channel sent from the base station.

To enable the subscriber unit to distinguish pilot channels from different base stations, the pilot PN sequence is offset in time by an offset index, which is measured in units of 64 PN chips of a pilot PN sequence, relative to the 0 offset pilot PN sequence. The offset index may also be referred to herein as a frame offset, which is an offset in time that is less than the duration of a frame.

When a subscriber unit is powered up it uses a searcher to find a pilot channel. Once a pilot channel is found, the subscriber uses the pilot PN sequence rollover point as a reference point to demodulate the sync channel using Walsh code 32. Once a complete sync message is recovered and decoded, the PN offset information is used to synchronize the subscriber unit with system time. Next, the subscriber unit receives and demodulates information on a paging channel, which contains information to help the subscriber unit find pilot channels from nearby base stations, with which the subscriber unit may handoff. This information is typically organized in a neighbor list, which informs the subscriber unit of pilot PN sequence offset indexes of the nearby base stations. Thus, once the subscriber unit has completed the processing of the initial signal acquisition, the subscriber unit uses pilot channels identified in the neighbor list to determine the best base station for maintaining a communication link.

As mentioned previously, pilot channels from different base stations are identified by an offset index, which may also be called a frame offset. This method of identification works because all base stations are synchronized to system time. Benefits to having base stations synchronized to system time include the ability to implement a relatively simple searcher in the subscriber unit, the ability to quickly set the searcher to the PN sequence offset index of a neighboring pilot channel for measuring signal strength, and the ability to measure time of flight and time of arrival for use in subscriber location finding systems.

However, synchronizing base stations is not accomplished without cost. Base stations are typically synchronized with GPS receivers, which add to the cost of the base station. Additionally, some base stations may be located so that GPS satellite signals are not available for reception at a point close to the base station. For example, if a CDMA base station is located in a subway, GPS signals cannot be easily received. Thus, there may be a need for an unsynchronized base station in some CDMA cellular communications systems.

If an unsynchronized base station is used in a CDMA system with synchronized base stations, and the unsynchronized base station uses the common PN spreading sequence used by all other synchronized base stations, the subscriber unit may no longer be able to properly identify pilot channels from base stations by determining the PN sequence offset index of the pilot signal. This is because the PN sequence of the unsynchronized pilot channel will drift relative to system time, causing it to periodically appear to be one or another of the synchronized base stations in the system.

Thus, to distinguish pilot channels of unsynchronized base stations from pilot channels of synchronized base stations, and pilot channels of unsynchronized base stations from one another, the unsynchronized pilot channel uses a pilot PN sequence that is different from a common pilot PN sequence used by all synchronized base stations. Furthermore, as compared to one another, the unsynchronized pilot PN sequences must be different from those used in adjacent cells in order to distinguish closely spaced unsynchronized pilot channels from each other. Typically, several unsynchronized pilot PN sequences are chosen (perhaps as many as 32 different sequences) so that a subscriber unit may be able to perform measurements and handoff between adjacent unsynchronized cells. The number of unsynchronized pilot PN sequences should be large enough to support an acceptable PN sequence reuse pattern should a service area of contiguous unsynchronized cells be needed.

A draw back of mixing synchronized and unsynchronized cells in a CDMA cellular system is that the pilot channel searcher in the subscriber unit has to be more complicated because it no longer searches for a common pilot PN sequence. A pilot searcher that searches for many pilot PN sequences at many frame offset indexes would be a slow searcher, which would slow access to the system and handoffs between cells.

Figure 1:
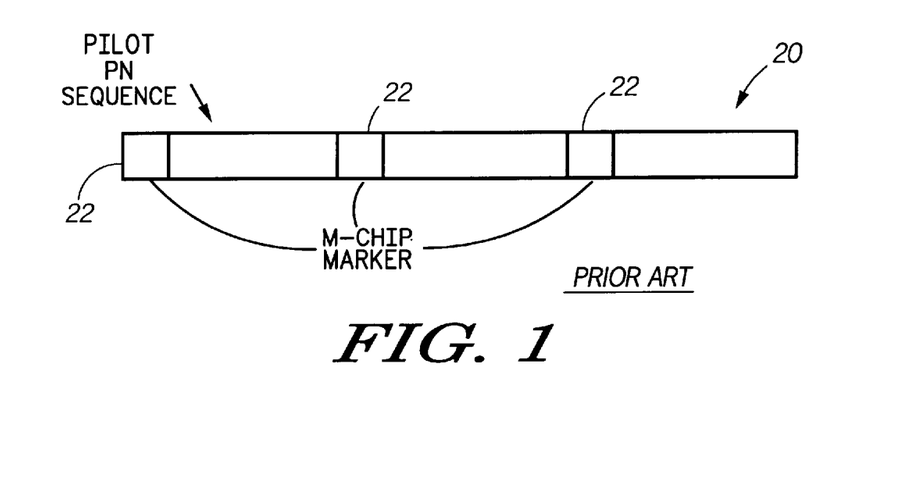
FIG. 1 depicts a pilot PN sequence used in a prior art cellular communication system having all unsynchronized base stations.

With reference now to FIG. 1, there is depicted a pilot PN sequence for use in a cellular communications system wherein all base stations are unsynchronized. This pilot PN sequence is described in a paper entitled "Fast Cell Search Algorithm in DS-CDMA Mobile Radio Using Long Spreading Codes" by K. Higuchi, M. Sawahashi, and F. Adachi, published in 1997 in the IEEE Vehicular Technology Conference Proceedings, pp. 1430–1434. As illustrated, pilot PN sequence 20 uses a plurality of M-chip markers 22 spaced evenly at N number of locations in pilot PN sequence 20. The system disclosed in the article is not compatible for integration into a synchronized cellular communications system.

Therefore, a need exists for an improved method and system for integrating synchronized and unsynchronized spread spectrum signals in a cellular communications system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 2:
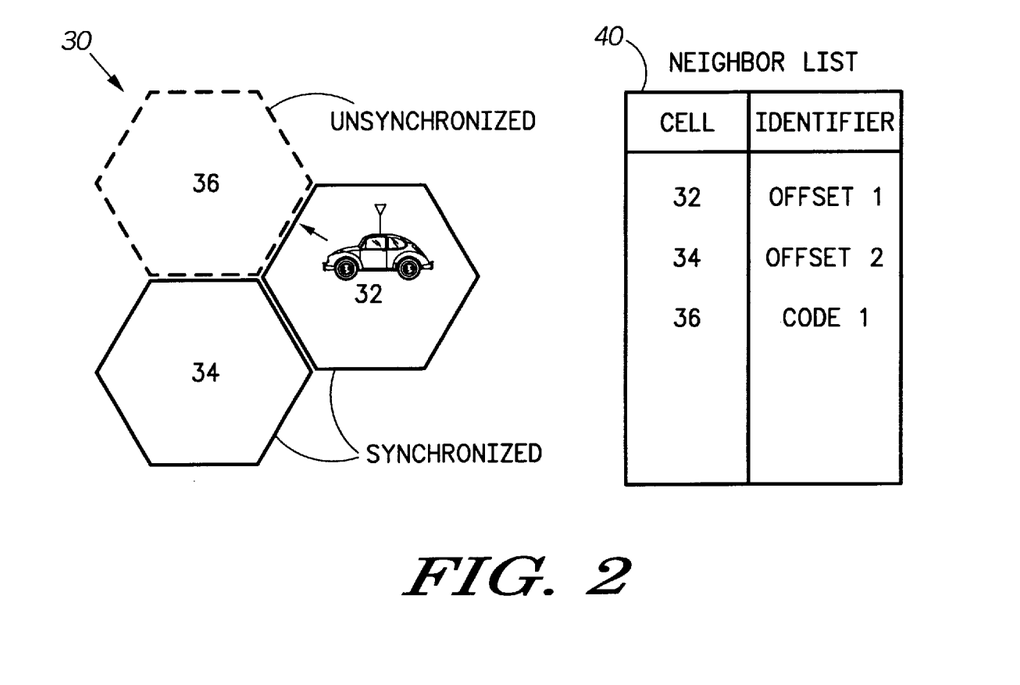
FIG. 2 depicts a cellular communications system having synchronized base stations and unsynchronized base stations in accordance with the method and system of the present invention.

With reference now to the figures, and in particular with reference to FIG. 2, there is depicted a cellular communications system having synchronized and unsynchronized base stations in accordance with the present invention. As is shown, cellular communications system 30 includes cells 32–36, wherein cells 32 and 34 are synchronized to system time and cell 36 is unsynchronized. A synchronized cell is one in which the cell base station transmits digital transmissions that are referenced or synchronized to a common system-wide clock, which is usually synchronous with GPS time. An unsynchronized cell has a base station that is not synchronized with system time. A cell in an ANSI J-STD-008 CDMA cellular communications system is an example of a synchronized cell.

As illustrated, subscriber unit 38 is currently in cell 32, and proceeding toward cell 36. If subscriber unit 38 is currently processing a call, a handoff between cell 32 and cell 36 will be needed to continue the call. In order to perform a handoff, subscriber unit 38 reports the signal strength, or other quality indicator, of pilot signals from cells 32 and 36 to a data processor that handles mobility management. In order to report these pilot signal strengths, subscriber unit 38 must search for, find, and measure the pilot channel signal strengths. Pilot channels in cells 32 and 34 are identified and located in subscriber unit 38 according to a frame offset of a common pilot PN sequence, as indicated in neighbor list 40. Thus, synchronized cells 32 and 34 use the same common pilot PN sequence for spreading the pilot channel, with the difference between the two pilot channels being the frame offset, or time within a frame duration that the common pilot PN sequence rolls over.

Because cell 36 is not synchronized to system time, the pilot channel of cell 36 cannot be identified or located using a frame offset. The rollover point of the pilot PN sequence used in cell 36 may occur anywhere in a frame time that is referenced to system time. Subscriber unit 38 must search an entire frame (or at least several known portions) in order to correlate a pilot channel with an expected pilot PN sequence.

Additionally, the pilot PN sequence for cell 36 cannot be the same as the common pilot PN sequence used in cells 32 and 34. This is because the unsynchronized pilot PN sequence in cell 36 may arbitrarily align itself with common pilot PN sequences used in synchronized cells, which would cause the pilot channel in the unsynchronized cell to mascarade as a synchronized pilot channel. To solve this problem, pilot PN sequences in unsynchronized cells use a PN sequence other than the common pilot PN sequence so that unsynchronized pilot channels may be identified by codes rather than frame offsets relative to system time. This identification by code of an unsynchronized pilot is shown in neighbor list 40.

Figure 3:
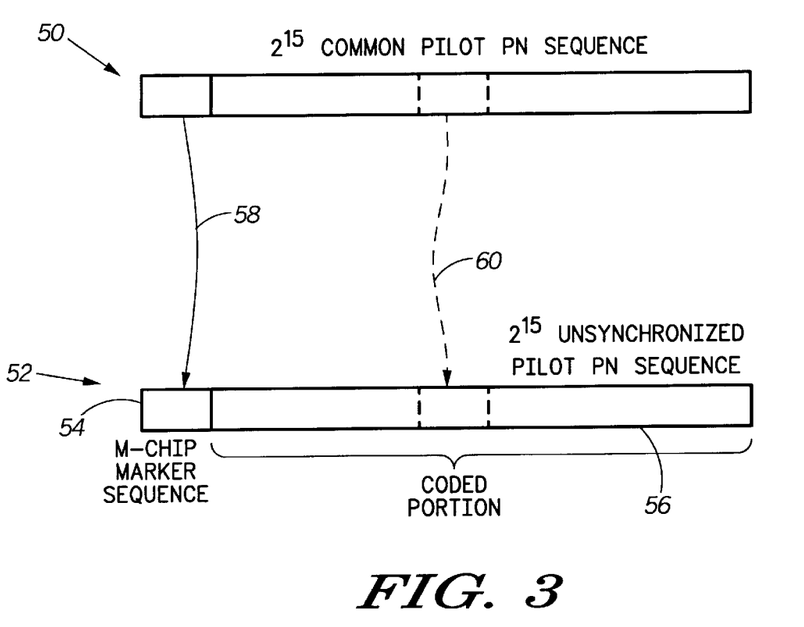
FIG. 3 illustrates a relationship between a common pilot PN sequence and an unsynchronized PN sequence in accordance with the method and system of the present invention.

With reference now to FIG. 3, there is depicted a relationship between a common pilot PN sequence and an unsynchronized pilot PN sequence in accordance with the present invention. As illustrated, common pilot PN sequence 50 is comprised of $2^{15}$ chips, or bits in the PN sequence. The common pilot PN sequence is used to spread the baseband pilot channel signal. Pilot channels from different synchronized base stations are identified by different common pilot PN sequence offsets. In a preferred embodiment, common pilot PN sequence 50 is implemented according to ANSI J-STD-008.

According to the present invention, a unsynchronized pilot PN sequence 52 used to spread pilot signals at unsynchronized base stations comprises marker sequence 54 and coded portion 56. In a preferred embodiment, marker sequence 54 is comprised of M number of chips copied from common pilot PN sequence 50, as shown at reference numeral 58. These copied chips have the same values in both common pilot PN sequence 50 and unsynchronized pilot PN sequence 52.

Marker sequence 54 preferably occurs at the being of unsynchronized pilot PN sequence 52, but may also be implemented with chips copied from another portion of common pilot PN sequence 50, as shown at reference numeral 60. In an alternative embodiment, reference numeral 60 may indicate that a second marker sequence is copied from common pilot PN sequence 50.

The length of unsynchronized pilot PN sequence 52 is preferably equal to the length of common pilot PN sequence 50. However, in alternate embodiments, the length of unsynchronized pilot PN sequence 52 may be equal to the length of common pilot PN sequence 50 divided by an integer, so long as the length of the PN sequence does not lose its pseudonoise properties or usefulness as a spreading sequence. The length of unsynchronized pilot PN sequence 52 may also be integer multiples of the length of common pilot PN sequence 50.

Figure 4:
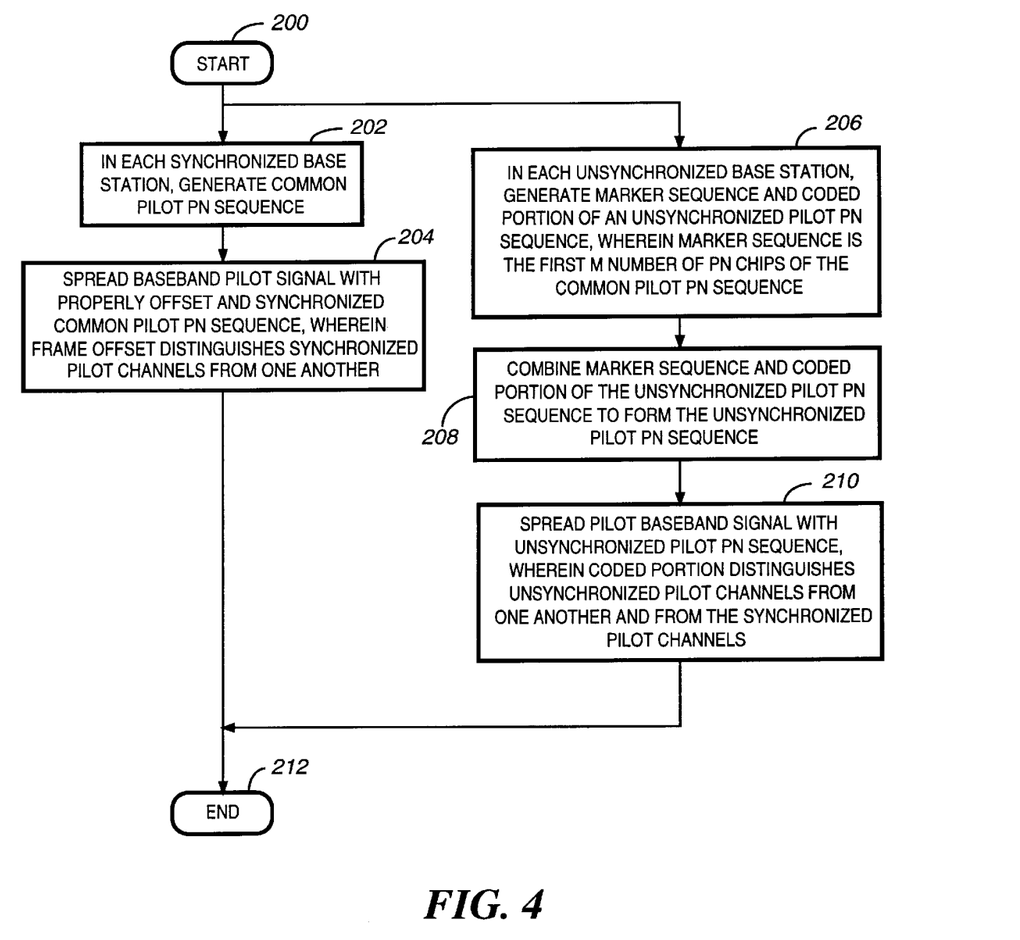
FIG. 4 is a high-level logic flowchart which illustrates the method of generating pilot channels in a cellular communications system having synchronized and unsynchronized base stations in accordance with the method and system of the present invention.

With reference now to FIG. 4, there is depicted a high-level logic flowchart of the method of generating pilot channels in a cellular communications system having synchronized and unsynchronized base stations in accordance with the present invention. As illustrated, the process begins at block 200 and thereafter passes to block 202 wherein a common pilot PN sequence is generated in each synchronized base station. Thereafter, the baseband pilot signal is spread with a properly offset and synchronized common pilot PN sequence in each synchronized base station, as illustrated at block 204. Note that a frame offset distinguishes synchronized pilot channels from one another.

In a parallel process occurring in each unsynchronized base station, the process generates a marker sequence and a coded portion of an unsynchronized pilot PN sequence, as depicted at block 206. In a preferred embodiment, the marker sequence has the same chip values as the first M number of PN chips in the common pilot PN sequence used in the synchronized base stations.

Next, the marker PN sequence and the coded portion of the unsynchronized pilot PN sequence are combined to form the unsynchronized pilot PN sequence, as illustrated at block 208. In a preferred embodiment, this combining step is implemented by concatenating marker sequence 54 with coded portion 56, as illustrated in FIG. 3.

Other means for combining the marker sequence and the coded portion are possible. For example, the marker sequence and the coded portion may be combined in a Boolean operation wherein the coded portion is preferably the same length as the common pilot PN sequence. Such Boolean operations include ANDing, ORing, or XORing the marker sequence with coded portion.

After combining the sequences, the pilot baseband signal is spread with the unsynchronized pilot PN sequence, as depicted at block 210. Note that the coded portion of the unsynchronized pilot PN sequence distinguishes unsynchronized pilot channels from one another, and from the synchronized pilot channels.

The process of generating common pilot PN sequences and unsynchronized pilot PN sequences ends, as illustrated at block 212. According to an important aspect of the present invention, each unsynchronized pilot PN sequence contains a marker sequence, which is a copy of values of M number of PN chips of the common pilot PN sequence used in each synchronized base station.

Figure 5:
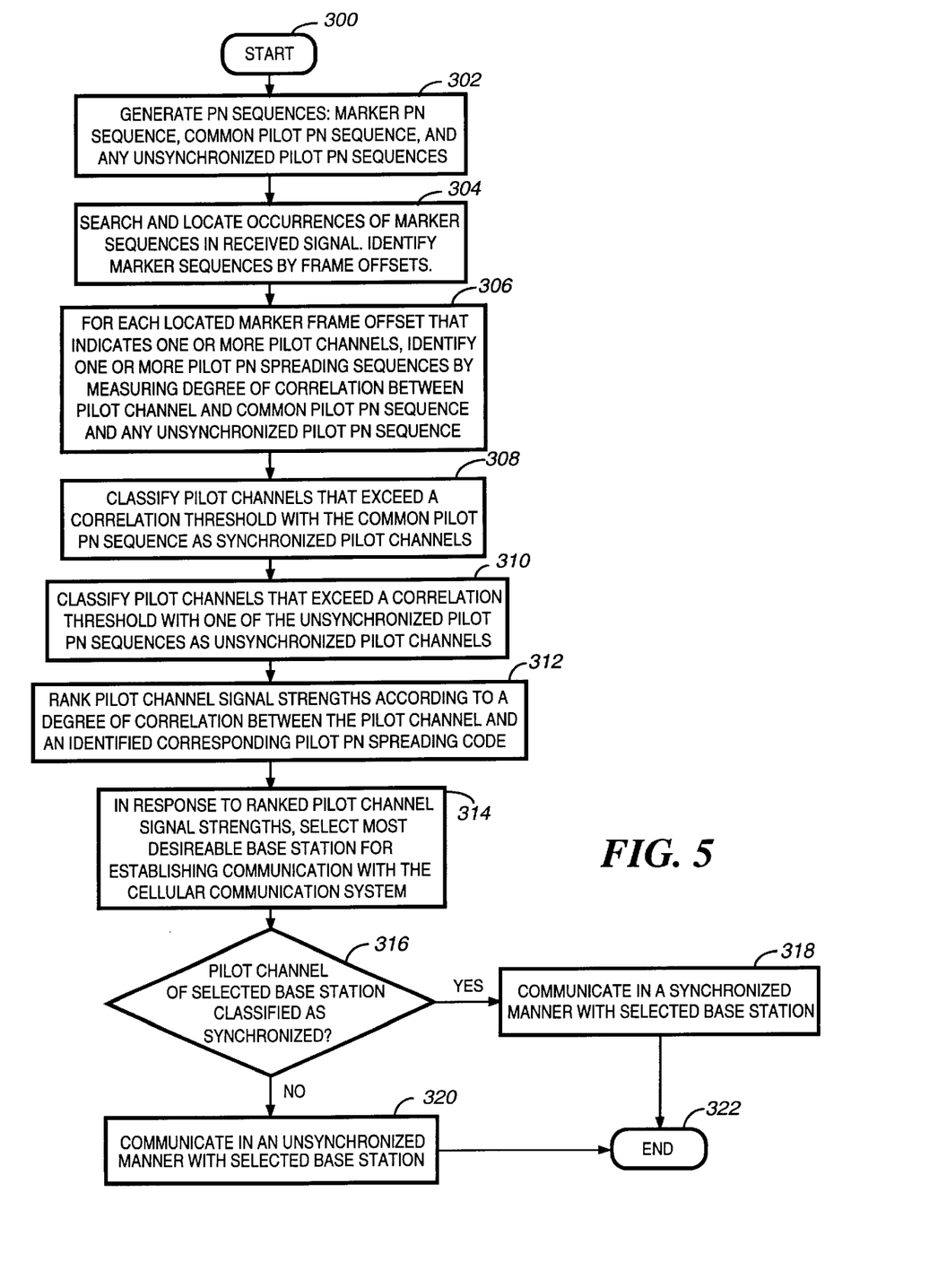
FIG. 5 is high-level logic flowchart which illustrates the method of finding and classifying pilot channels in a cellular communications system having synchronized and unsynchronized base stations in accordance with the method and system of the present invention.

With reference now to FIG. 5, there is depicted a high-level logic flowchart depicting the method of finding and classifying pilot channels in a cellular communications system having synchronized and unsynchronized base stations in accordance with the present invention. As illustrated, the process begins at block 300 and thereafter passes to block 302 wherein the process generates several PN sequences in the subscriber unit. These PN sequences include a marker sequence, a common pilot PN sequence, and any unsynchronized pilot PN sequences used in the cellular communications system. Such PN sequences may be generated using N-bit shift registers coupled to various logic gates, as is known in the art. Common pilot PN sequence generation is specified in the standards document known as ANSI J-STD-008.

The marker sequence is a sequence of chip values copied from the common pilot PN sequence. The unsynchronized pilot PN sequence is formed by combining the marker sequence with a coded portion PN sequence to form an unsynchronized pilot PN sequence. The coded portion has different chip values in different unsynchronized pilot PN sequences.

After generating PN sequences, the process searches and locates occurrences of marker sequences in a received signal, as illustrated at block 304. The search function is preferably implemented by correlating the marker sequence with a stream of chips at the output of a digital radio. When the marker sequence is detected, the maker sequence is identified by a frame offset. The frame offset is a time relative to system time, or relative to a time reference in the subscriber unit that is substantially synchronized with system time.

Figure 6:
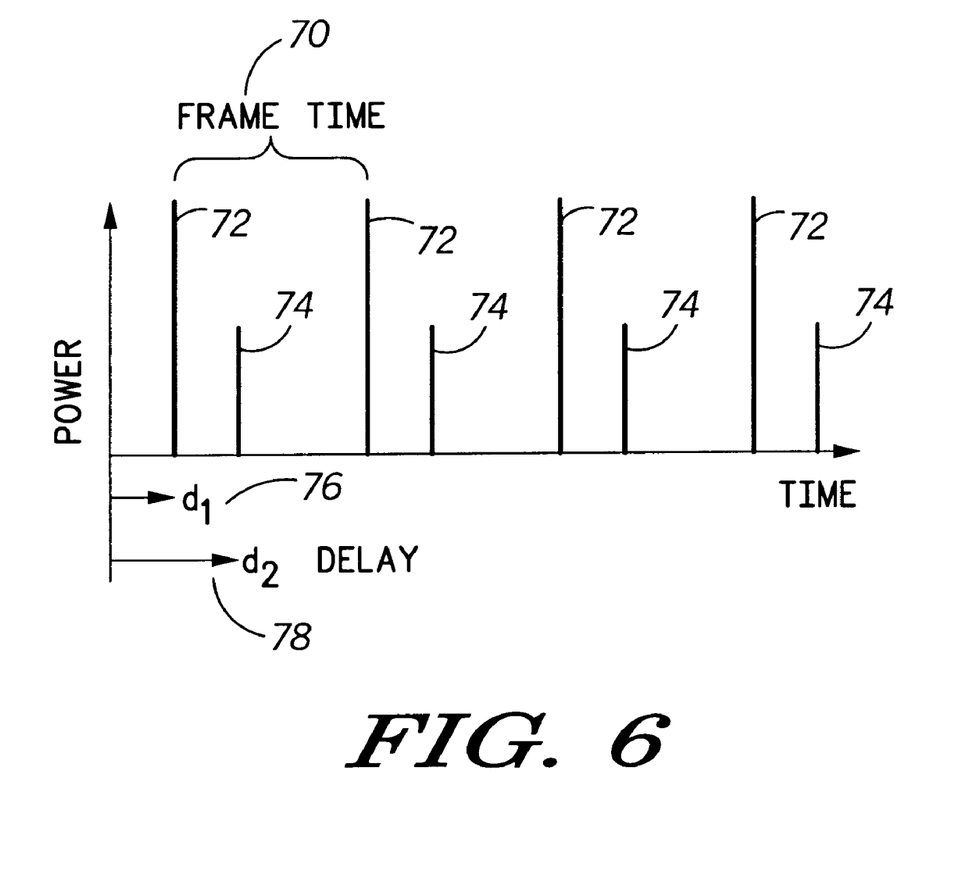
FIG. 6 is a graph that illustrates a marker sequence power delay profile in accordance with the method of the present invention.

Referring now to FIG. 6, there is depicted a graph illustrating a marker sequence power delay profile. In this graph, correlation or power is plotted against time. A frame time, or frame duration, is shown at reference numeral 70. As the process correlates the marker sequence with incoming data or chips, the output of the correlator shows power spikes as illustrated along the time axis. Within each frame time 70, marker sequences 72 and 74 occur at frame offset 76 and 78, respectively. The marker sequence power delay profile of FIG. 6 may have been generated by a subscriber unit within range of two base stations, with the subscriber unit closer to the base station associated with marker 72 than the base station associated with marker 74.

Also note that after locating marker sequences, the subscriber unit does not know whether the marker sequence belongs to a synchronized or unsynchronized base station. Furthermore, each located marker sequence may represent more than one pilot channel because unsynchronized pilot channels may drift to coincide in time with synchronized pilot channels.

With reference again to FIG. 5, the process next identifies one or more pilot PN spreading sequences used to spread pilots indicated by each marker sequence frame offset, as depicted at block 306. The pilot PN spreading sequence may be identified by measuring a degree of correlation between the received pilot channel and the common pilot PN sequence and any unsynchronized pilot PN sequences used in the cellular system. During this step, the process determines what pilot PN sequence was used to spread each pilot channel indicated by a frame offset of a marker sequence.

In one embodiment, the identity of the pilot PN spreading sequences is determined by correlating each indicated pilot channel with each pilot PN sequence used in the system. These pilot PN sequences include the common pilot PN sequence used for all synchronized base stations and each unsynchronized pilot PN sequence used in various unsynchronized base stations. This step may be executed serially or in parallel depending upon speed requirements and hardware resources available.

Next, the process classifies pilot channels that exceed a correlation threshold with the common pilot PN sequence as synchronized pilot channels, as illustrated at block 308. Similarly, the process then classifies pilot channels that exceed a correlation threshold with one of the unsynchronized pilot PN sequences as an unsynchronized pilot channel, as depicted at block 310.

After each pilot channel is classified, the process ranks the pilot channel signal strengths by ranking a degree of correlation between the pilot channel and the identified corresponding pilot PN spreading code, as illustrated at block 312. In this signal strength ranking step, the degree of correlation is used to proportionally indicate the signal strength.

Next, in response to the ranked pilot channel signal strengths, the process selects the most desirable base station for establishing communication with the cellular communication system, as depicted at block 314. Preferably, the most desirable base station selected is the base station with a pilot channel having the highest signal strength. However, some systems may select the most desirable base station based on different criteria. For example, some systems may prefer using a synchronized base station, and therefore select the best synchronized base station that meets minimum standards.

Next, the process determines whether the pilot channel of the selected base station is classified as a synchronized pilot channel, as illustrated at block 316. If the base station has a synchronized pilot channel, the subscriber unit communicates in a synchronized manner with the selected base station, as depicted at block 318. In a preferred embodiment, communicating in a synchronized manner is implemented by communicating according to ANSI J-STD-008.

If, at block 316, the process determines that the pilot channel of the selected base station is classified as an unsynchronized pilot channel, the subscriber unit communicates in an unsynchronized manner with the selected base station, as illustrated at block 320. Communicating in an unsynchronized manner means using the unsynchronized PN spreading sequence used in these selected base stations to despread signals received at the subscriber unit. Furthermore, the subscriber unit synchronizes with the selected unsynchronized base station in a manner similar to that described in ANSI J-STD-008.

As shown at block 322, the process of locating and classifying a pilot channel according to the present invention ends.

While the process depicted in FIG. 5 generally describes the operation of a subscriber unit at power up, the principles of operation illustrated in FIG. 5 apply during a handoff of a subscriber unit, wherein the subscriber unit must find and classify pilot channels in the subscriber unit's neighbor list. Moreover, the subscriber unit may be designed to continuously scan for new pilot channels, and upon finding a new pilot channel the subscriber unit must classify the pilot channel as coming from either a synchronized or unsynchronized base station.

Figure 7:
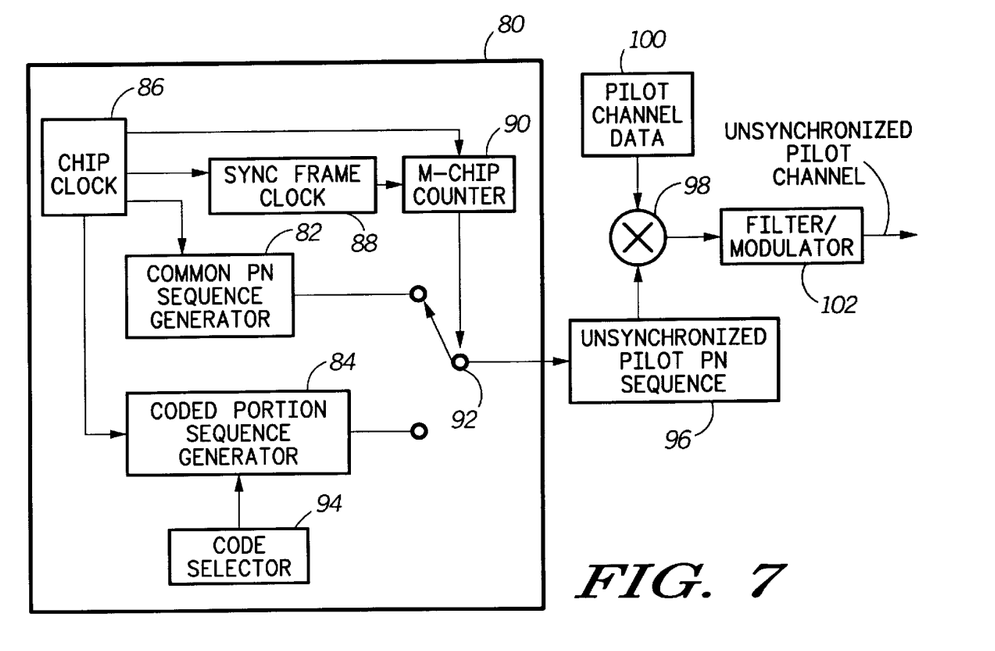
FIG. 7 is a high-level block diagram of a system for generating an unsynchronized pilot PN sequence in accordance with the method and system of the present invention.

With reference now to FIG. 7, there is depicted a high-level block diagram of a system for generating an unsynchronized pilot PN sequence in accordance with the method and system of the present invention. As illustrated, unsynchronized pilot PN generator 80 includes common PN sequence generator 82 and coded portion sequence generator 84, which are both coupled to, and synchronized by, chip clock 86. Note that chip clock 86 is not synchronized to system time because this system shown in FIG. 7 is used in an unsynchronized base station.

Sync frame clock 88 and M-chip counter 90 are also coupled to chip clock 86. Sync frame clock 88 marks the passage of a frame. M-chip counter 90 causes switch 92 to connect the output of common PN sequence generator 82 to the output of unsynchronized pilot PN generator 80 for a duration of M number of chips in each frame, as synchronized by frame clock 88. After switching for M number of chips, switch 92 connects coded portion sequence generator 84 to the output of unsynchronized pilot PN generator 80 for the remainder of the frame.

Code selector 94, which is coupled to coded portion sequence generator 84, may be used to select various PN sequences which coded portion sequence generator 84 is capable of producing. Different PN sequences generated by coded portion sequence generator 84 are used to identify and distinguish pilot signals from various unsynchronized base stations.

After generating the unsynchronized pilot PN sequence 96, the sequence is coupled to spreader 98, along with pilot channel baseband signal 100, so that the pilot channel baseband signal may be spread with the unsynchronized pilot PN sequence. The output of spreader 98 is an unsynchronized pilot channel.

As can be seen in FIG. 7, the unsynchronized pilot PN sequence 96 is generated in a preferred embodiment by concatenating the output of common PN sequence generator 82 with the output of coded portion sequence generator 84. Other methods of generating unsynchronized pilot PN sequence 96 are possible. For example, an N-bit shift register coupled to various feedback loops and logic gates may be devised to generate the unsynchronized pilot PN sequence 96 characterized by a portion of the sequence (the marker sequence) having the same chip values as a portion of a common pilot PN sequence used in synchronized base stations.

In an alternate embodiment of unsynchronized pilot PN sequence generator 80, switch 92 may be connected to common PN sequence generator 82 for more than one M-chip period during a frame. This type of configuration may be used to generate an unsynchronized pilot PN sequence having more than one marker sequence. If two marker sequences are used in the unsynchronized pilot PN sequence they are preferably placed at the beginning and at the middle of the sequence.

In yet another embodiment, common PN sequence generator 82 may be replaced by a marker sequence generator. The marker sequence generator may be implemented by a device such as a video random access memory (VRAM) that shifts bits from memory as it is clocked by chip clock 86. Thus, this marker sequence generator is only required to generate chips in the marker sequence(s) and not an entire common pilot PN sequence.

Figure 8:
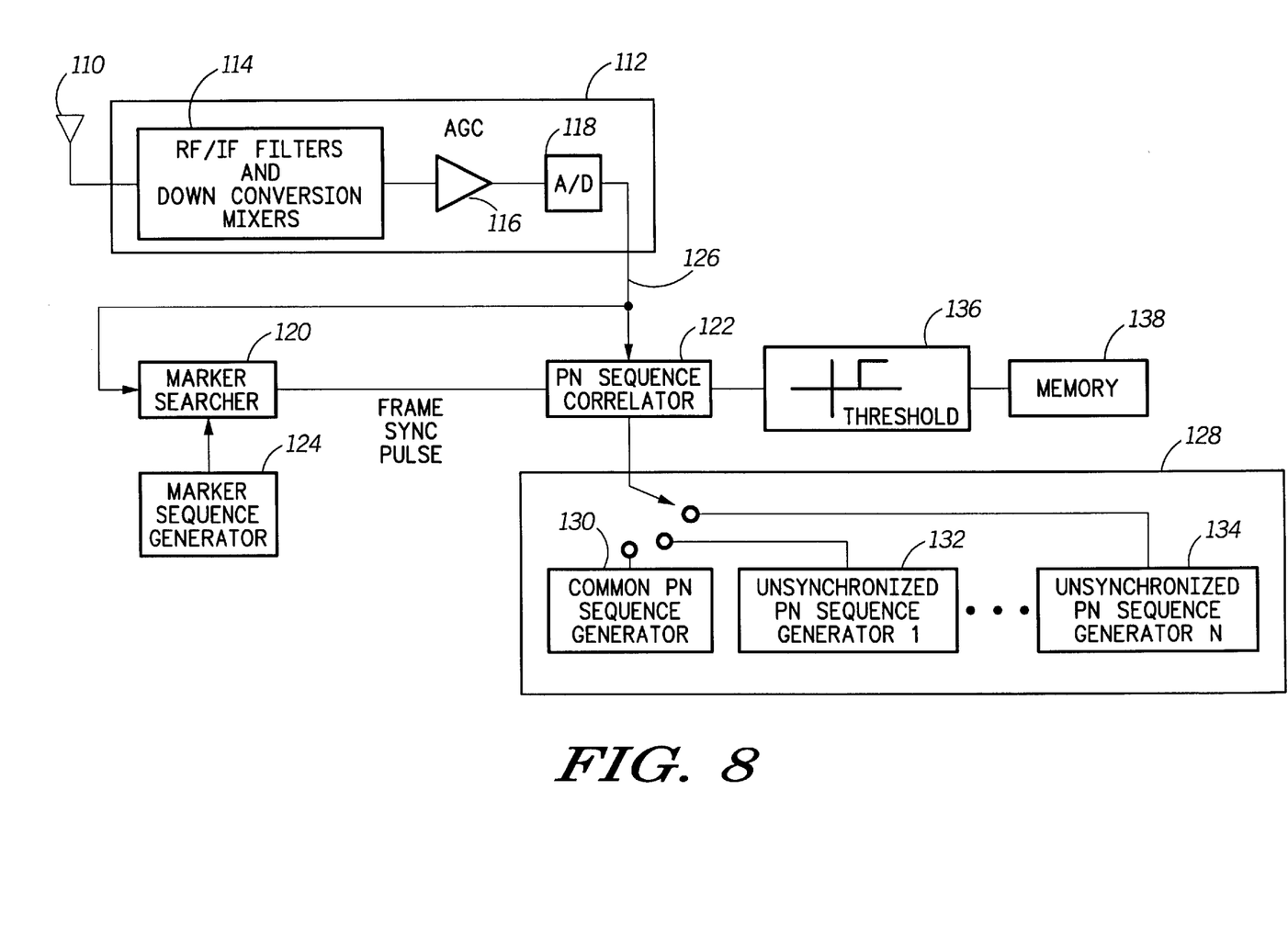
FIG. 8 is a high-level block diagram of a system for finding and classifying a pilot channel in a cellular communications system having synchronized and unsynchronized base stations according to the present invention.

Finally, with reference to FIG. 8, there is depicted a high-level block diagram of a system for finding and classifying a pilot channel in a cellular communications system having synchronized and unsynchronized base stations in accordance with the present invention. As illustrated, antenna 110 receives signals for digital radio front end or digital receiver 112. As used herein, digital receiver 112 includes filter/down converter 114, automatic gain control 116, and A-to-D converter 118.

The output of digital receiver 112 is coupled to marker sequence searcher 120 and PN sequence correlator 122.

Marker sequence searcher 120 correlates the output of marker sequence generator 124 with received signal 126 to locate occurrences of the marker sequence in the received signal. As a marker sequence is detected in received signal 126, marker sequence searcher 120 communicates a frame offset to PN sequence correlator 122. PN sequence correlator 122 then synchronizes with the frame offset and correlates received signal 126 with a selected PN sequence from PN sequence generator 128.

PN sequence generator 128 includes a common PN sequence generator 130 and unsynchronized PN sequence generators 132–134.

The output of PN sequence correlator 122 is coupled to pilot correlation threshold detector 136, which determines whether or not a degree or correlation exceeds a pilot correlation threshold. If the degree of correlation exceeds the pilot correlation threshold, the frame offset and the PN sequence associated with the located pilot channel are recorded in memory 138 for further processing by the subscriber unit.

Those persons skilled in the art should recognize that searching for pilot channels associated with both synchronized and unsynchronized base stations is easier when both synchronized and unsynchronized pilot channels include a marker sequence having a selected number of PN chips having the same values in both PN sequences. The present invention permits the subscriber unit to use a single searcher to search for both synchronized and unsynchronized pilot channels. This reduces the hardware requirements and power consumption in the subscriber unit, where both hardware and power resources are scarce.

As depicted in FIG. 8, PN sequence correlator 122 attempts to correlate with all PN sequences generated in PN sequence generator 128 in order to conclusively identify one or more pilot signals as indicated by each marker sequence offset. In order to avoid the tedious process of correlating with each PN sequence, marker sequence searcher 120 and marker sequence generator 124 may be duplicated and inserted serially between marker searcher 120 and PN sequence correlator 122. This new duplicated searcher and marker sequence generator may be analogized to a second stage marker sequence searcher. Thus, in operation, marker sequence searcher 120 may locate, with a frame offset, a marker sequence common to all PN sequences, and thereafter, the second stage marker searcher may search for a unique selected M number of PN chips that follow the marker sequence in each of the pilot PN sequences used in the system. If the second marker searcher stage identifies a selected marker sequence unique to one of the pilot PN sequences, that correlating pilot PN sequence is indicated to PN sequence correlator 122 as having a high probability of being the pilot PN sequence used to spread that pilot channel.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

I claim:

1. A method for generating an unsynchronized pilot channel for an unsynchronized base station in a cellular communications system having synchronized base stations and unsynchronized base stations, wherein the synchronized base stations are synchronized to system time and have a common pilot PN sequence used for all synchronized pilot channels, the method comprising the steps of:

selecting a marker sequence comprised of a portion of the common pilot PN sequence;

generating a coded portion of an unsynchronized pilot PN sequence to identify a selected unsynchronized base station;

combining the marker sequence and the coded portion of the unsynchronized pilot PN sequence to form the unsynchronized pilot PN sequence; and spreading an unsynchronized pilot channel baseband signal of an unsynchronized base station with the unsynchronized pilot PN sequence to produce the unsynchronized pilot channel.

2. The method for generating an unsynchronized pilot channel according to claim 1 wherein the step of selecting a marker sequence comprised of a portion of the common pilot PN sequence further includes selecting a marker sequence comprised of a portion of an ANSI J-STD-008 pilot pseudonoise spreading sequence.

3. The method for generating an unsynchronized pilot channel according to claim 1 wherein the step of selecting a marker sequence comprised of a portion of the common pilot PN sequence further includes selecting the first M number of PN chips of the common pilot PN sequence as a marker sequence.

4. The method for generating an unsynchronized pilot channel according to claim 3 wherein the step of combining the marker sequence and the coded portion of the unsynchronized pilot PN sequence to form the unsynchronized pilot PN sequence further includes concatenating the marker sequence and the coded portion of the unsynchronized pilot PN sequence, wherein the common pilot PN sequence for the synchronized base stations and the unsynchronized pilot PN sequence for the unsynchronized base stations begin with the same M number of PN chips.

5. The method for generating an unsynchronized pilot channel according to claim 1 wherein the length of the unsynchronized pilot PN sequence and the common pilot PN sequence is the same.

6. A system for generating an unsynchronized pilot channel for an unsynchronized base station in a cellular communications system having synchronized base stations and unsynchronized base stations, wherein the synchronized base stations are synchronized to system time and have a common pilot PN sequence used for all synchronized pilot channels, the system comprising:

means for generating a marker sequence having chip values equal to chip values of a portion of the common pilot PN sequence;

means for generating a coded portion of an unsynchronized pilot PN sequence to identify a selected unsynchronized base station;

means for combining the marker sequence and the coded portion of the unsynchronized pilot PN sequence to form the unsynchronized pilot PN sequence; and means for spreading an unsynchronized pilot channel baseband signal of an unsynchronized base station with the unsynchronized pilot PN sequence to produce the unsynchronized pilot channel.

7. The system for generating an unsynchronized pilot channel according to claim 6 wherein the means for generating a marker sequence having chip values equal to chip values of a portion of the common pilot PN sequence further includes means for generating a marker sequence having chip values equal to chip values of a portion of an ANSI J-STD-008 pilot pseudonoise spreading sequence.

8. The system for generating an unsynchronized pilot channel according to claim 6 wherein the means for generating a marker sequence having chip values equal to chip values of a portion of the common pilot PN sequence further includes means for generating a marker sequence having a first M number of PN chip values equal to chip values of the first M number of PN chips of the common pilot PN sequence.

9. The system for generating an unsynchronized pilot channel according to claim 8 wherein the means for combining the marker sequence and the coded portion of the unsynchronized pilot PN sequence to form the unsynchronized pilot PN sequence further includes means for concatenating the marker sequence and the coded portion of the unsynchronized pilot PN sequence, wherein the common pilot PN sequence for the synchronized base stations and the unsynchronized pilot PN sequence for the unsynchronized base stations begin with M number of PN chips having the same values.

10. The system for generating an unsynchronized pilot channel according to claim 6 wherein the length of the unsynchronized pilot PN sequence and the common pilot PN sequence is the same.

11. A method for finding and classifying a pilot channel in a cellular communications system having synchronized base stations and unsynchronized base stations, wherein the synchronized base stations are synchronized to system time and use a common pilot PN sequence for synchronized spreading of the pilot channel, the method comprising the steps of:

locating occurrences of a marker sequence in a received signal, wherein the marker sequence is a selected number of PN chips having the same value in the common pilot PN sequence and each unsynchronized pilot PN sequence, and wherein the common pilot PN sequence and each unsynchronized pilot PN sequence are otherwise different;

in response to degree of correlation between the common pilot PN sequence and the received signal, at a frame offset indicated by a selected occurrence of a marker sequence, exceeding a pilot correlation threshold, associating the frame offset with a pilot channel classified as a synchronized pilot channel; and in response to degree of correlation between an unsynchronized pilot PN sequence and the received signal, at the frame offset indicated by the selected occurrence of the marker sequence, exceeding a pilot correlation threshold, associating the frame offset with a pilot channel classified as an unsynchronized pilot channel.

12. The method for finding and classifying a pilot channel according to claim 11 wherein the step of locating occurrences of a marker sequence in a received signal further includes measuring a degree of correlation between a marker sequence and periodic portions of a received signal.

13. The method for finding and classifying a pilot channel according to claim 11 wherein the selected unsynchronized pilot PN sequence is the same length as the common pilot PN sequence.

14. The method for finding and classifying a pilot channel according to claim 11 wherein the marker sequence is the first M number of PN chips in the common pilot PN sequence.

15. The method for finding and classifying a pilot channel according to claim 11 further including the step of identifying a pilot PN sequence used to spread the pilot channel classified as an unsynchronized pilot channel in response to a threshold-exceeding correlation between a correlating one of a group of unsynchronized pilot PN sequences and the pilot channel classified as an unsynchronized pilot channel.

16. The method for acquiring a pilot channel according to claim 11 wherein a frame offset indicated by a selected occurrence of a marker sequence further includes a frame offset indicated by a an occurrence of a marker sequence having the greatest signal strength.

17. A system for finding and classifying a pilot channel in a cellular communications system having synchronized base stations and unsynchronized base stations, wherein the synchronized base stations are synchronized to system time and use a common pilot PN sequence for synchronized spreading of the pilot channel, the system comprising:

means for locating occurrences of a marker sequence in a received signal, wherein the marker sequence is a selected number of PN chips having the same value in the common pilot PN sequence and each unsynchronized pilot PN sequence, and wherein the common pilot PN sequence and each unsynchronized pilot PN sequence are otherwise different;

means for associating the frame offset with a pilot channel classified as a synchronized pilot channel in response to degree of correlation between the common pilot PN sequence and the received signal, at a frame offset indicated by a selected occurrence of a marker sequence, exceeding a pilot correlation threshold; and means for associating the frame offset with a pilot channel classified as an unsynchronized pilot channel in response to degree of correlation between an unsynchronized pilot PN sequence and the received signal, at the frame offset indicated by the selected occurrence of the marker sequence, exceeding a pilot correlation threshold.

18. The system for finding and classifying a pilot channel according to claim 17 wherein the means for locating occurrences of a marker sequence in a received signal further includes means for measuring a degree of correlation between a marker sequence and periodic portions of a received signal.

19. The system for finding and classifying a pilot channel according to claim 17 wherein the selected unsynchronized pilot PN sequence is the same length as the common pilot PN sequence.

20. The system for finding and classifying a pilot channel according to claim 17 wherein the marker sequence is the first M number of PN chips in the common pilot PN sequence.

21. The system for finding and classifying a pilot channel according to claim 17 further including means for identifying a pilot PN sequence used to spread the pilot channel classified as an unsynchronized pilot channel in response to a threshold-exceeding correlation between a correlating one of a group of unsynchronized pilot PN sequences and the pilot channel classified as an unsynchronized pilot channel.

22. The system for acquiring a pilot channel according to claim 17 wherein a frame offset indicated by a selected occurrence of a marker sequence further includes a frame offset indicated by a an occurrence of a marker sequence having the greatest signal strength.

* * * * *